(12) United States Patent
Phillips

(10) Patent No.: US 8,650,043 B1
(45) Date of Patent: Feb. 11, 2014

(54) SEMANTIC MODEL FOR INSURANCE SOFTWARE COMPONENTS

(75) Inventor: Chris Phillips, Brookfield, WI (US)

(73) Assignee: Stoneriver, Inc., Brookfield, WI (US)

( * ) Notice: Subject to any disclaimer, the term of this patent is extended or adjusted under 35 U.S.C. 154(b) by 17 days.

(21) Appl. No.: 13/339,916

(22) Filed: Dec. 29, 2011

Related U.S. Application Data

(60) Provisional application No. 61/428,419, filed on Dec. 30, 2010.

(51) Int. Cl.
*G06Q 10/00* (2012.01)
*G06Q 40/00* (2012.01)

(52) U.S. Cl.
USPC .................................. 705/2; 705/35

(58) Field of Classification Search
USPC ........................................ 705/2, 35
See application file for complete search history.

(56) References Cited

U.S. PATENT DOCUMENTS

| | | | | |
|---|---|---|---|---|
| 5,890,129 | A * | 3/1999 | Spurgeon ........................ | 705/4 |
| 2002/0046067 | A1 * | 4/2002 | Kraehenbuehl et al. .......... | 705/4 |
| 2007/0050219 | A1 * | 3/2007 | Sohr et al. ....................... | 705/4 |

OTHER PUBLICATIONS

Cassidy, Michael Francis; "The effects of sensory verus semantic encoding instructions, study time, and reterieval cues on memory for pictures"; UMI Dissertations Publishing; 1980.*
Becich, Michael J. "Advancing Practice, Instruction, and Innovation Through Informatics (APIII 2007) Conference: Scientic Session Presentation Abstracts and Scientific Poster Session Abstracts"; Archives of Pathology & Laboratory Medicine; May 2008.*

* cited by examiner

*Primary Examiner* — Edward Chang
(74) *Attorney, Agent, or Firm* — Standley Law Group LLP

(57) ABSTRACT

A computer implemented method and system for insurance enterprise management and data acquisition and communication has an enterprise service bus and semantic model for communicating across different insurance businesses to retrieve data common to one service. The system and method utilizes a semantic model under a service oriented architecture which facilitates an insurance administration suite that supports user configuration of modules for use across a plurality of insurance business functions and lines. The integrated insurance administration suite supports insurance workflow management by allowing a user to configure modules to meet the needs of an insurance carrier. Insurance administration suite modules have functionality for policy, claims, billing, collections, financials, distribution, business intelligence, and reinsurance. Modules may be implemented as an integrated, enterprise solution for all lines of business that a carrier handles. The configuration features and functionality allows the entire suite to be adapted to meet the needs of the enterprise.

5 Claims, 4 Drawing Sheets

SEMANTIC MODEL FOR INSURANCE SOFTWARE COMPONENTS

CROSS-REFERENCE TO RELATED APPLICATIONS

This application claims the benefit of U.S. Provisional Application No. 61/428,419, titled SEMANTIC MODEL FOR INSURANCE SOFTWARE COMPONENTS, filed Dec. 30, 2010.

TECHNICAL FIELD

The present disclosure relates generally to computerized systems and methods for providing insurance services. More particularly, the present disclosure relates to a computerized system and method for identifying and managing data to facilitate straight-through processing in order to manage the workflow and data access of multiple insurance processes according to an enterprise model.

BACKGROUND OF THE ART

Conventional insurance businesses traditionally grow from providing one type of insurance (e.g. auto insurance) to providing several differing types simultaneously. This pattern generally results in incorporating a new set of information and data management. Additionally, each type of insurance often has its own specialized software and computer interface for accessing data, or as the enterprise expands into new insurance businesses it develops new software and interfaces for the new business.

Therefore, insurance companies that offer personal and commercial lines of insurance have relied on a variety of separate and distinct proprietary software applications that support various administrative functions for each line of insurance. Typically, each application provides features and functionality that support business operations such as billing, collections, policy administration, claims, and reinsurance administration for disparate lines of insurance. Although the applications have been available for many years and offer a variety of sophisticated features and functionality, the applications are developed and enhanced separately and therefore, have few, if any, features and functionality in common. More importantly, the applications typically do not use the same databases and in some cases, may not have access to the same data. If data across applications is not updated appropriately, employees using the applications risk accessing outdated or inaccurate data when providing assistance and services to agents and/or policy customers.

The use of separate and distinct proprietary applications within an insurance company is inefficient and ineffective for the company's employees as well as the company's agents and customers. In addition to data consistency problems, employees that manage a variety of tasks for the different lines of insurance are often required to switch between applications to complete the tasks. Each application may have an entirely different user interface as well as work flow management model. Users are required either to become proficient with each application or if time and resources do not permit, limit their use to fewer applications. As a result, one employee may not have the expertise to follow a task to completion and may be required to transfer responsibility for completing a task to another employee more familiar with the application needed to complete the task. If employees are required either to learn and switch between multiple applications or to transfer responsibility to other employees based on their application expertise, time and resources that could be devoted to servicing agents and customers may otherwise be devoted to activities associated with using separate and distinct proprietary applications.

There is a need for a computerized insurance administration system and method that supports user configuration of modules providing functionality for a plurality of insurance administration operations. There is a need for a computerized insurance administration suite that supports user configuration of modules for use across a plurality of insurance business functions and lines. There is a need for an integrated insurance administration suite that supports insurance workflow management by allowing a user to configure modules to meet the needs of an insurance carrier. There is a need for an enterprise-based semantic model for linking and accessing data across enterprise-defined lines of business.

SUMMARY OF THE INVENTION

This and other unmet needs of the prior art are met by a system as described in more detail below.

The present disclosure describes a computerized insurance administration system and method that utilizes a novel semantic model to support communication between disparate modules providing functionality for a plurality of insurance administration operations and encourages straight-through processing (STP). The computerized system and method implements an insurance administration suite that supports communication and STP across a plurality of insurance business functions and lines. The integrated insurance administration suite also supports insurance workflow management by allowing a user to configure modules to meet the needs of an insurance carrier.

In an example embodiment, insurance administration suite modules comprise functionality for policy, claims, billing, collections, financials, distribution, business intelligence, and reinsurance. Modules may be implemented individually or together as an integrated, enterprise solution for all lines of business that a carrier handles. Each module may be configured to meet the needs of the enterprise. Modules are configured using an integrated development environment with a novel semantic model. The configuration features and functionality allows the entire suite of modules to be adapted to meet the needs of the enterprise.

Service Oriented Architecture (SOA) is a guiding principle for managing complex businesses. SOA often rely on a mesh of software services to manage data and services. As insurance businesses grow, however, the software services are not designed to account for differences related to the types of insurance businesses. A more efficient business model organizes related services in a horizontal hierarchy, rather than in independent, parallel vertical structures. In order to implement such a hierarchy, the businesses must communicate when, for example, displaying data for several types of claims. This communication can be accomplished via an Enterprise Service Bus (ESB). Often an ESB uses a Semantic model to facilitate communication and data acquisition from disparate data repositories.

Disclosed embodiments describe a computer-implemented method of accessing information stored in diverse formats, for use in a service module within an insurance administration suite, the method includes the steps of:
(a) receiving from an application module a service request that semantically identifies a type of information sought by the request;

(b) converting the received service request to a generic request having corresponding request parameters at a semantic object provider;

(c) opening a data-repository connection within a data access system corresponding to the service request;

(d) requesting data having properties corresponding to the service request;

(e) transmitting the converted request to the data access system;

(f) receiving data from the data access system corresponding to the converted request; and (g) providing data to the application module.

Disclosed embodiments describe a system for providing a suite of insurance services, the system including: a group of service modules for providing policy administration services, billing management services, claims administration services, reinsurance services and workers compensation insurance services; an integrated user interface for accessing all the service modules in the group of insurance service modules and for transmitting requests from users and providing requested data; an interface layer in communication with the integrated user interface and the group of insurance service modules, the layer receiving requests from the user interface; data repositories having billing, claims, and policy information; a semantic object provider in communication with the interface layer and data repositories, the provider converting data for semantic requests; and wherein the system allows access to policy administration services, billing management services, and claims administration services from the integrated user interface.

BRIEF DESCRIPTION OF THE DRAWINGS

A better understanding of the exemplary embodiments of the invention will be had when reference is made to the accompanying drawings, wherein identical parts are identified with identical reference numerals, and wherein.

DETAILED DESCRIPTION

According to the disclosed embodiment, a semantic model for an insurance business comprises an enterprise model, and within that enterprise, lines of business are supported by the enterprise. Services within the enterprise are implemented according to deployed services modules. The modules have rules engines which access information in a variety of data repositories according to pre-determined ontologies, allowing users to provide necessary services.

Figure 1:
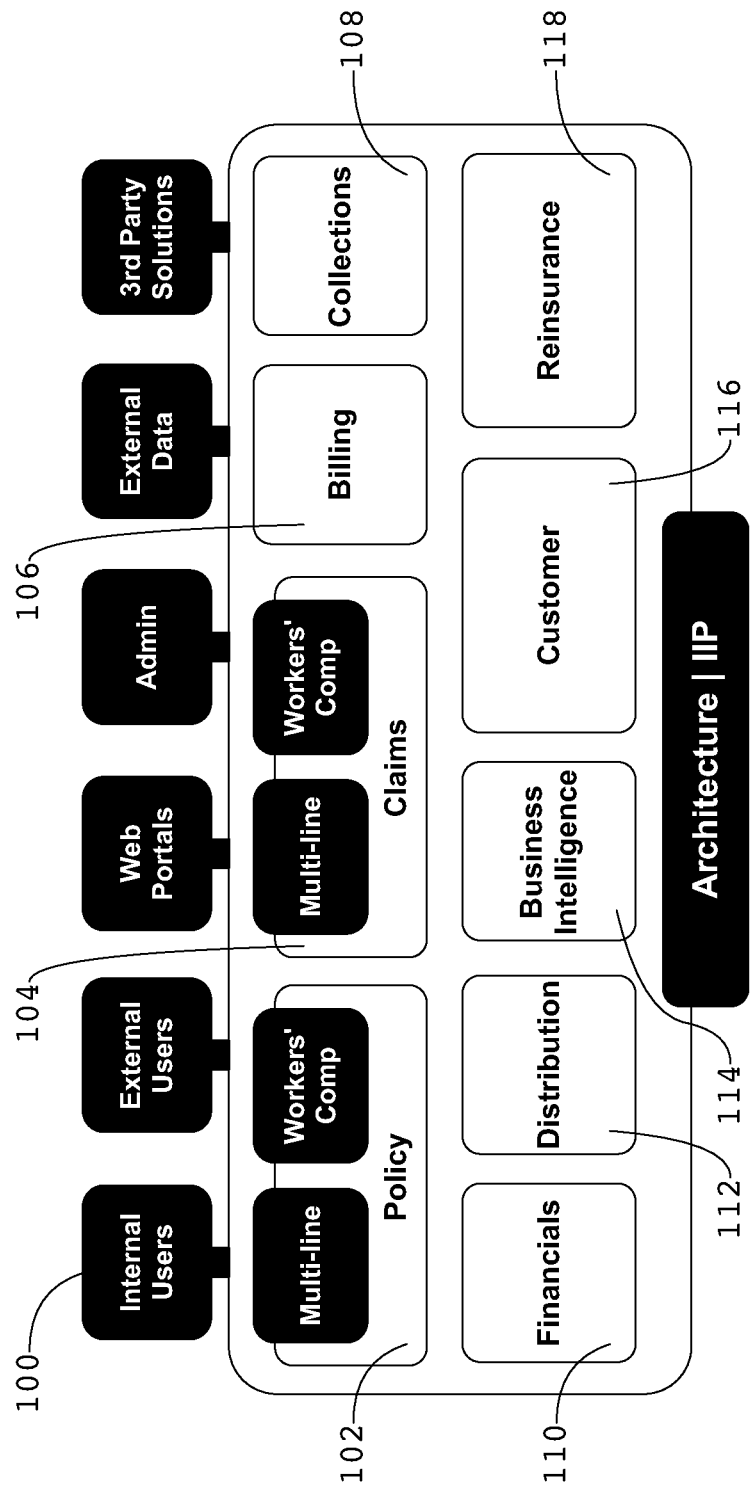
FIG. 1 is a diagram of an insurance enterprise divided into lines of business.

Turning to the drawings for a better understanding, FIG. 1 shows a model for an insurance enterprise divided into individual insurance administration modules. Each line of business has individual data repositories, service modules and applications that operate within the lines of business. In an example embodiment, configurable modules are organized into the following functional units:

TABLE 1

Insurance Suite Modules

| Module | | Description |
|---|---|---|
| Policy 102 | Multi-line Worker's Compensation | Policy administration including full lifecycle policy support from initial quote, through quoting to binding and amendment and cancellation functions. Supports complex policy transactions including both in-sequence endorsements as well as out-of-sequence endorsements while accurately tracking policy state for any target business date. Generation and management of all required policy documents is supported and coupled with event, BPM and rule processing to ensure full customization of all documents by company and jurisdiction. |
| Claims 104 | Multi-line Worker's Compensation | Management of claims. Supports user interface dashboards, workflow to automate claims department and drive adjusters through processes, business rules, and business process management to handle small, low severity (e.g., automated fast-path payment processing) to large, highly complex claims. Case management for long-term processes like subrogation, medical rehabilitation, and legal matters. Rules processing to automate functions such as fraud referrals, customer edits, and information requests. |
| Billing 106 | | Management of billing with support for mid-term changes and transaction history. Features include: direct bill support with agency bill support before the end of the year receivable processing (including non-premium) cash processing electronic funds transfer (EFT), credit (through a third party for recurring payments), and payroll deduction processing refund processing document management general ledger support online bill presentment and payment reporting |

TABLE 1-continued

Insurance Suite Modules

| Module | Description |
| --- | --- |
| Collections 108 | Collections support for both billing accounts behind in payments as well as claims recoveries from third parties. |
| Financials 110 | Common insurance financial transaction tracking used for extensively to support billing, collections and claims and provides common interface to an external general ledger system. |
| Distribution 112 | Management of agency information such as agent and agency contact information, agreements, and commissions. Supports management of information for agency hierarchies with n-tier support based on agency type, licensing details, and basic/advanced searching for agents and agencies. Agency agreements may be defined by corporation and company including appointment status, authorized lines of business, and commission schedules. Commission capabilities include standardized commission calculations and releasing commissions to be paid. Commission types can be standard, graduated, and sliding scale and campaign. Commission override is available at the policy level. Statement and transaction views allow a user to work with agency financials or transactions for an agency account. Release methods include written premium, paid, written premium-minimum paid, invoiced, invoiced and paid, and invoiced and fully paid. |
| Business Intelligence 114 | Central business intelligence functionality across all insurance functions consisting of an operational data store (ODS) and a series of domain specific data marts with ETL scripts extracting, translating and loading data from on-line transaction databases to the ODS and additional scripts to create load the data mart from the ODS. |
| Customer 116 | Management of information about people and organizations such as names, demographics, and tax information along with addresses, banking information, etc. Supports workflow, work management, and business rules as well as importing customer information from external sources, duplicate checking on configurable levels, and address verification and geo-coding by an external processor. |
| Reinsurance 118 | Reinsurance administration system for ceded, assumed or retroceded reinsurance administration, regardless of volume. Features include: automated attachment, calculation and posting of premium, loss cessions and retrocessions reinsurance accounting and cash management consolidated into one area one-click, accurate generation of Schedule F consistent application of contract rules with treaty and facultative contract management management of reinsurance claims with customized billing, first notice of loss, and status request letters error and exception reporting |

User interaction options that may be supported include internal users, external users, web portals, system administration, external data entry, and third party solutions 100.

Figure 2:
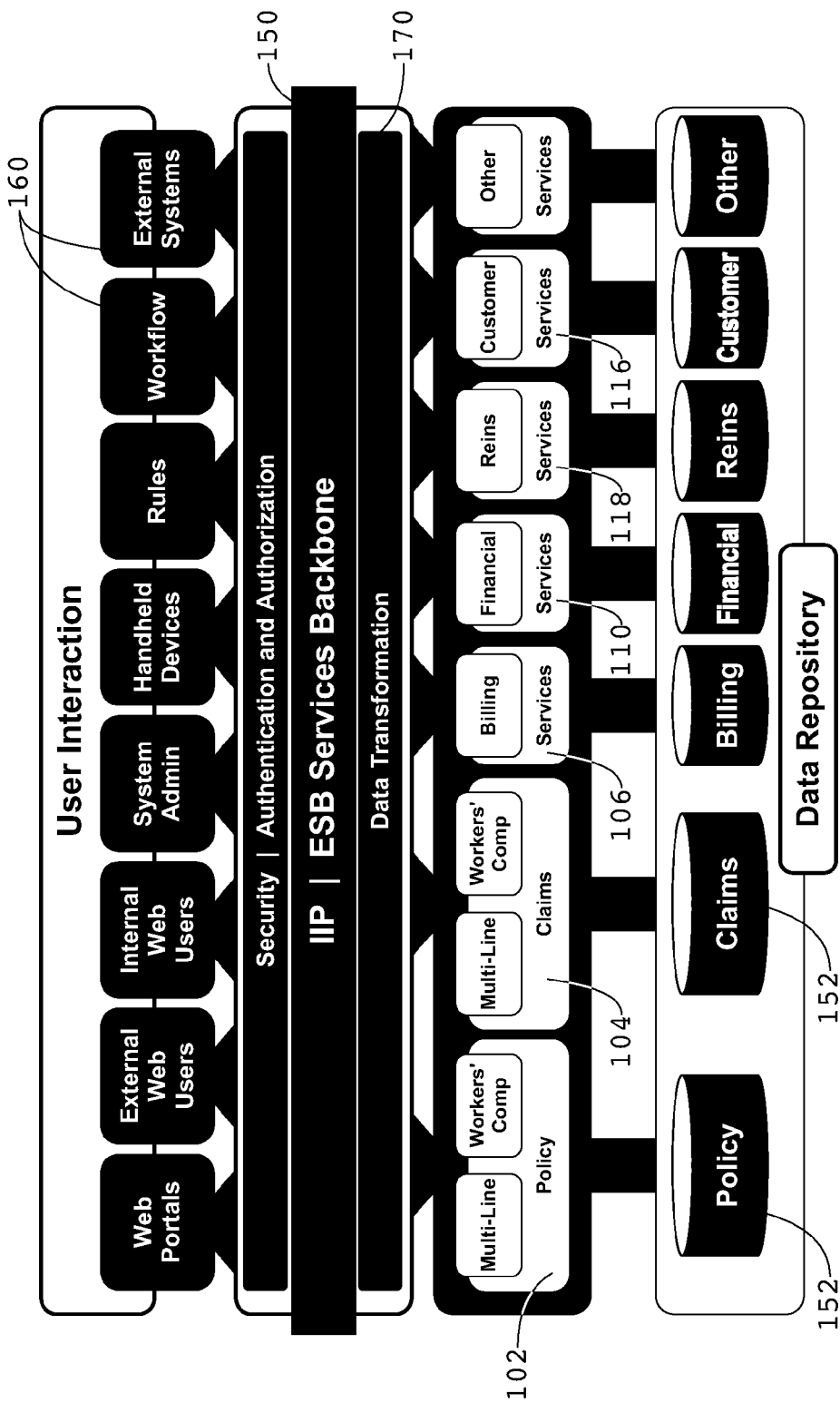
FIG. 2 is a block diagram of a platform for execution of insurance administration modules

FIG. 2 shows a block diagram of a platform for execution of insurance services according to an example embodiment. In this embodiment, the application modules (Policy 102, claims 104, Billing 106, Financial 110, Reinsurance 118, Customer 116) execute on a bus 150 that supports interaction with various user interfaces 160. The applications are supported by a data access system and various data repositories 152 in which policy, claims, billing, financial, reinsurance, customer, and other types of data are stored. The executable modules and plug-ins that result from a configuration process may be deployed as needed to meet the needs of the insurance carrier and access data as needed across data repositories according to predetermined semantic models. A semantic object provider 170 provides data transformation that converts semantic requests according to semantic models in order to access data across multiple data repositories for use and access by the applications and users.

The semantic object provider converts service requests received from service modules to a generic request having corresponding request parameters. The conversion utilizes generic terms provided by semantic models designed around each module. As each module will use data in unique ways, each model will balance the priorities of the specific module with providing enterprise-necessary across modules. The generic terms used to categorize data will reflect these priorities. An example of a semantic model is provided as FIG. 4.

Once a service request has been received and converted to a generic request, a connection may be made to a data access system, the system including at least one data repository. The connection allows for transmission of queries into the data access system and receiving responses to the requests. After a request has been transmitted to the data access system and the system has acquired the data from the repository, the data is then transmitted to the appropriate service module.

Service modules are, fundamentally, units of executable code that implement predetermined actions or functions. Through the modules, various insurance services are organized and implemented. In the disclosed embodiment, the service modules are comprised of a logical grouping of operations or transactions (e.g., read a record, modify a record, prompt a user). These operations or transactions are organized according to semantic models detailing the ontology of information for operations or interactions within the system or prompts for users of the system.

In the disclosed embodiment of the invention, the system platform is based on a Java-based, Service Oriented Architecture (SOA). Users are connected to services by an enterprise service bus (ESB) 150 or an interface layer programmed to provide the interface between users and the service modules. The interface layer coordinates distributed transactions with multiple services. In the disclosed embodiment, the ESB may also be configured to function as a gateway or translation interface to services that are not accessible by standardized formats. For example, existing in-house legacy systems or third party systems can be integrated into the system.

The present system provides a platform that integrates previously different systems into a comprehensive suite of insurance services accessible from an integrated user interface. The platform of the present invention is referred to herein as Insurance Integration Platform (IIP). These service modules are configured so that certain services or functionality may be used for multiple user interactions (e.g., a program for retrieving client information may be used for policy inquiries as well as claims processing) according to the ontologies.

The present system can be configured with one service orchestration application for invoking the functions of the service modules or a series of service orchestration applications. For example, each main functionality provided by the system (e.g., policy administration, claims management, billing, reinsurance policy administration) can be implemented with a service orchestration application or a subset of multiple applications. The service orchestration applications initiate a particular process flow by calling a service module or series of service modules in sequence according to the semantic requests made by users or applications.

The disclosed embodiment is implemented on a SOA platform that supports major database engines and numerous hardware platforms. Users of the present system that provide insurance services and support are provided with seamless pre-integration, a consistent user experience, and the power of sharing services across the enterprise with full customer centricity.

The suite or services in the disclosed embodiment can be configured and customized based on the user's needs and/or budget. In other words, the user can choose to only activate certain service modules or features. The user may also choose to phase-in implementation of individual components of the system. For example, the user may initially activate the multi-line policy service module, the multi-line claims module, and the billing module opting to activate the Worker's compensation, policy and claims modules at a later time.

The disclosed embodiment of the present invention makes it much easier and faster to add, remove, replace or modify insurance services, functionality, and/or products provided by the system of the present invention. For example, by adding a new product as a new service module, the new product can be quickly integrated into the existing product suite by adding the new service module to the service orchestration application layer and ESB.

Workflow within an insurance enterprise may be divided into projects within each line of business, and those projects further divided into subprojects with the subprojects comprising work processes and discrete work items. The semantic model creates a roadmap for associating content in data repositories that is necessary for completion of the projects etc. while supporting user configuration of modules for use across a plurality of insurance business functions and lines.

Figure 3:
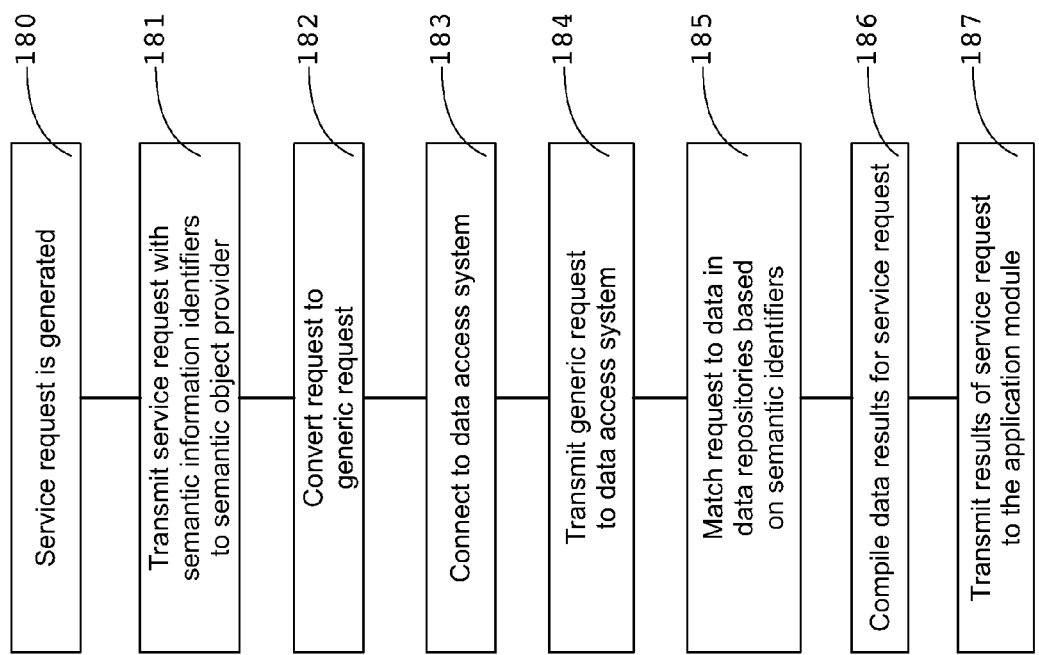
FIG. 3 is a flow chart showing an embodiment of a method for accessing information store in diverse formats.

FIG. 3 is a flowchart showing an embodiment of a computer-implemented method of accessing information stored in diverse formats. The method begins with the generation of a service request 180 at a service module. The request is then transmitted to a semantic object provider 181, the request having certain semantic properties. The object provider then converts the request to a generic request 182 based on a corresponding semantic model. A connection is created 183 for transmission of the generic request to the data access system. Once a connection is established, the generic request is then transmitted to the data access system 184. The data access system then matches the request 185 to corresponding data based on the semantic identifiers. The data results for the request are then compiled 186 and subsequently transmitted to the application module 187 from which the request originated.

Figure 4:
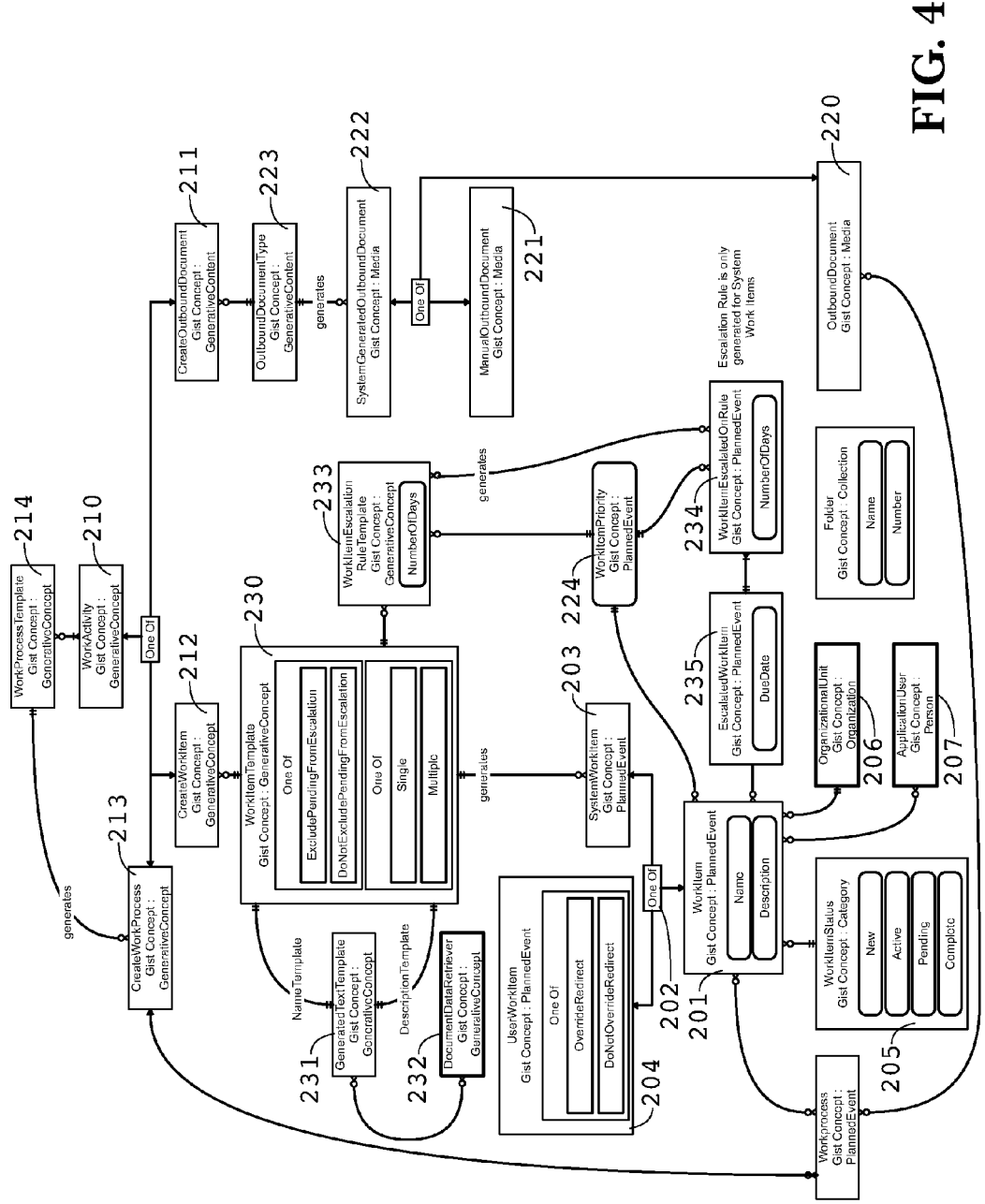
FIG. 4 is a flow chart demonstrating ontology for workflow in an insurance enterprise.

FIG. 4 shows a diagram of a semantic model for workflow in an insurance enterprise. This semantic model is a roadmap for implementing workflow in a service module which may be deployed within a line of business in an insurance enterprise depending on the needs or requests of the user. When a service module is deployed that uses the workflow semantic model, tasks and projects are organized and content and prompts are generated for items and processes within the workflow projects some of which require user input and others of which are wholly internal processes within the system. The workflow model may have application in several lines of business such as billing, claims, disbursements etc.

As shown, the work item 201 has a name and a description. Conceptually, a work item is a fundamental piece of a project and may be as simple as the completion of a document or a simple task, but may often be part of a larger web of work items within a process or project. The rounded blocks within other blocks are fundamental information, such as here the name of the work item. Above the work item box is an alternative box 202 showing that work items may be either system work items 203 (those completed within the system) or user work items 204. Below the work item box is the work item status box 205. The arrow connecting this box shows that each work item has a status associated with it, but that many work items may have the same status. In this embodiment, the status indicators comprise: new, active, pending and complete. Also associated with the work item 201 is the organizational unit 206, according to the arrows, in this embodiment, the work item may be associated with one and only one organizational unit within the enterprise. Next is the application user 207, this provides the name and possibly other information for people that are responsible or that have access to this work item. The arrow indicate that multiple users may be associated with each work item.

Near the top, work activity 210 may be one of: create outbound document 211; create work item 212; or create work process 213. If it is to create a work process, then the work process template 214 is engaged. These are choices between types of generative content as shown within the boxes. Additionally, creating a work process may include further creating work activity 210 as shown by the association lines connecting the top boxes. By the connection arrows, there is one and only one work process template associated with each create work process, but many create work processes may use the same template. If a create work process option is selected, then one or more work processes (a type of planned event) are generated. The work process may then be associated with work item(s) 201 or outbound documents 220 or both. Outbound documents are media and may be either manual outbound documents 221 or system generated documents 222. Additionally, if the work activity previously created an outbound document 223, the create outbound document is then associated with one outbound document type and the outbound document type can then generate a system generated document.

Should the work process be associated with a work item 201, as noted above, the work item may be either a user work item or a system work item. A user work item is a planned event and has an override redirect or a do not override redirect describing the user work item. Both types of work items have a work item priority 224 associated with them.

If the work activity is create work item and the work item is a system work item, then a work item template 230 is associated. As shown by the arrows, the work item template generates the system work item(s). Within the work item template, the item will have properties such as whether it is single or multiple, and whether to exclude pending from escalation. To the left of the work item template is a generated text template 231 the arrows show that it is associated with a name template or a description template. Additionally, the generated text template is associated document data retriever 232.

Each work item template may be associated with at least one work item escalation rule template 233. This has a data value of a number of days for prioritization purposes. The work item escalation rule template generates work item escalation rule 234 which is in turn associated with a work item priority 224 category. The work item escalation rule is again a number of days. The work item escalation rule 234 is then associated with an escalate work item 235 which is a planned event: the due date.

The semantic models illustrate a network of concepts and relationships between concepts that support a suite of administration services modules. Each of the models support features and functionality common to multiple lines of business that a carrier may offer. Employees of the carrier, therefore, may manage workflow across multiple lines of business and service customers in an efficient and effective manner, regardless of the type of insurance with which the task is associated.

Having shown and described an embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

What is clamed is:

1. A computer-implemented method of accessing information stored in a plurality of data repositories, for use in an executable service module of an insurance administration suite, comprising:
   (a) receiving at a server from an executable application module a service request comprising service request parameters and a semantic identifier for a predetermined semantic model for servicing the service request;
   (b) invoking at the server a semantic object provider that:
      (1) locates the predetermined semantic model based on the semantic identifier;
      (2) using the predetermined semantic model, generates a data repository request comprising corresponding data repository request parameters corresponding to the service request parameters;
   (c) opening by the server a data-repository connection within a data access system corresponding to the service request;
   (d) initiating by the server a data repository request for data having properties corresponding to the service request;
   (e) transmitting by the server the data repository request to the data access system;
   (f) receiving at the server data from the data access system corresponding to the data repository request; and
   (g) providing by the server the data to the application module.

2. The computer-implemented method of claim 1 wherein the executable service modules comprise policy, claims, billing, financial, reinsurance, and customer modules.

3. The computer-implemented method of claim 1 wherein the service module requests correspond to at least one ontology.

4. The computer-implemented method of claim 2 wherein requests corresponding to an enterprise billing module are organized according to a billing ontology.

5. A computerized system for providing a suite of insurance services, comprising:
   a server comprising a group of executable service modules for providing policy administration services, billing management services, claims administration services, reinsurance services and workers compensation insurance services;
   at least one user computer executing an integrated user interface for accessing all the executable service modules in the group of insurance service modules and for transmitting requests from the at least one user computer and providing requested data;
   an interface layer in communication with the integrated user interface of the user computer and the group of executable service modules at the server, the layer receiving service requests from the user interface;
   computerized data repositories comprising billing, claims, and policy information;
   an executable semantic object provider in communication with the interface layer and computerized data repositories, the provider:
      (1) locating a predetermined semantic model based on the service request from the user interface;
      (2) using the predetermined semantic model to generate a data repository request corresponding to the service request;
      (3) receiving from a data repository data responsive to the data repository request and having properties corresponding to the service request; and
      (4) returning to the interface layer for transmission to the user interface the data responsive to the repository request;
   and
   wherein the system allows access to policy administration services, billing management services, and claims administration services from the integrated user interface.

\* \* \* \* \*